Aug. 5, 1930.  E. HÄGGLUND  1,772,216
METHOD OF TREATING AND UTILIZING THE BLACK
LIQUOR OBTAINED IN THE SODA PULP PROCESS
Filed July 13, 1925
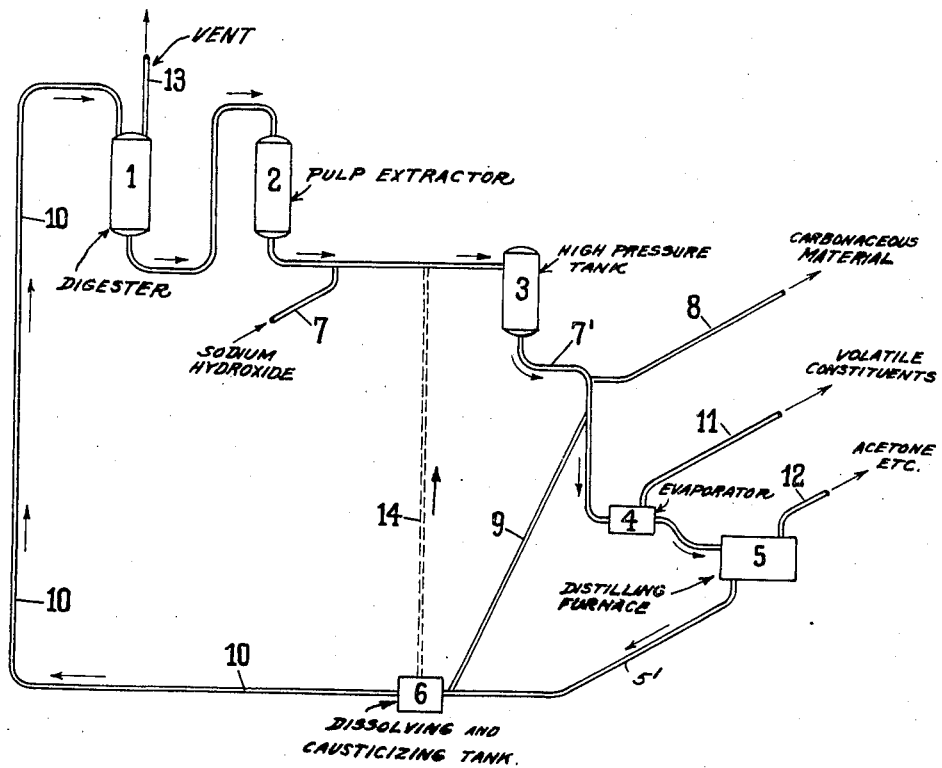
Inventor:
Erik Hägglund,
By Byrnes Townsend & Brickenstein,
Attorneys.

Patented Aug. 5, 1930

1,772,216

UNITED STATES PATENT OFFICE

ERIK HÄGGLUND, OF ABO, FINLAND

METHOD OF TREATING AND UTILIZING THE BLACK LIQUOR OBTAINED IN THE SODA-PULP PROCESS

Application filed July 13, 1925, Serial No. 43,367, and in Germany July 16, 1924.

This invention has reference to the treatment of the black liquor obtained in the manufacture of wood fibre by the soda process, and it is intended to facilitate the utilization and the separation of valuable products from this waste liquor. In accordance with well-known methods the majority of the organic constituents may be obtained from the liquor in the form of solid carbonaceous substances by a combined treatment with pressure and heat at about 350 degrees centigrade and at say 150 atmospheres pressure, the liquor remaining after the separation of said carbonaceous substances being then further treated for the recovery of organic residual compounds still existing therein, and in particular for the recovery of methyl alcohol, sodium acetate or acetone if so preferred.

Now, this invention comprises improvements in the method referred to, and it is intended to generally facilitate and to further develop the process of treatment and the methods of manufacture and to thereby obtain the highest yield possible of valuable organic substances, and in particular of acetone and methyl alcohol. An increase in the yield of acetone is produced by the present invention by the evaporation to dryness of the liquor coming from the pressure-and-heat treatment, and by then submitting the same to dry distillation.

In the evaporation of the alkaline liquor other organic compounds are distilled off. With a view of increasing the yield of such substances, and in particular of methyl alcohol, I may, and preferably do, increase the alkalinity of the black liquor before submitting the same to the combined high pressure and heat treatment. This increase may for instance be produced by an addition of sodium-hydrate in solid condition or in solution, or by producing therein the hydrate by the mutual reaction of carbonate of soda with lime, or by the addition of lime alone. The quantity of the sodium-hydrate introduced into the liquor is preferably so adjusted as to compensate for the losses of alkali occurring in the decomposition of material containing cellulose in the manufacture of pulp or wood fibre by means of sodium-hydrate. By this means the additional soda otherwise necessary in every stage of treatment in the manufacture of soda-fibre pulp is also utilized for the increase of the output in the working up of the black liquor. If it is not desired to avail oneself of this advantage, the increase of alkalinity of the black liquor may also be produced by the addition of quick lime which latter would be precipitated in the high-pressure tank substantially in the form of carbonate of lime together with the carbon produced.

For the purpose of increasing the yield of wood-fibre in the decomposition of the cellulose-containing material by means of sodium hydrate, it is preferable not to submit the total amount of the solution obtained in the high-pressure tank after the separation of the carbonaceous and pitchy substances to the treatment for the production of the valuable substances, such as acetone, methyl-alcohol and the like, but to treat a part thereof separately and to mix this portion with fresh cooking liquor for the treatment of fresh quantities of cellulose-containing material. With this procedure the separate quantity of liquor is preferably so adjusted that the contents of salt of the decomposition liquor remain constant in the continuous cycle of treatment.

The preferred means of carrying the invention into effect will be more particularly described hereinafter with reference to the accompanying drawing, showing by way of exemplification a diagram of a manufacturing plant for the execution of the invention. In the drawing 1 indicates a pulp-cooking digester, 2 indicates a pulp extractor in which the pulp is separated from the black liquor, 3 is a high-pressure tank, 4 is an evaporator, 5 is a distilling furnace, 5' represents a conduit or equivalent means for the introduction into dissolving causticizing tank 6 of the dry distillation residue obtained in furnace 5 and 6 indicates a dissolving causticizing tank. The black liquor coming from the diffusor or the like 2 is mixed with sodium-hydrate lye from the conduit 7. From the product of decomposition of the black liquor in the high-pressure container 3 discharged therefrom through the conduit 7' the carbonaceous and pitchy substances are separated off through the conduit 8, and then a portion of the remaining solution is branched off through the conduit 9 and is introduced into tank 6; this being indicated by joining conduit 9 with conduit 5'. Conduit 10 carries the causticized liquor from tank 6 to digester 1.

During the treatment of the solution in the preliminary evaporator 4 the volatile constituents, particularly methyl alcohol, are liberated and are carried off through the conduit 11. The dry residue of the evaporation is transferred to the distilling furnace, and is there submitted to distillation with superheated steam, while the volatile products of distillation, consisting mainly of acetone, are carried off by the conduit 12. The remaining solid residue mainly consisting of soda is transferred to the dissolving and causticizing tank 6 where it is dissolved and the resulting solution is treated with quick lime, in order to convert the soda into sodium-hydrate liquor in the well known manner and this liquor is introduced into the digester 1 by the conduit 10 above mentioned. 13 is a venting conduit for the digester 1.

*Example of operation of the process*

The pulp-cooking digester 1 is fed in usual manner with chips of wood and caustic cooking liquor, the proportion being so chosen that in normal operation each 1000 kilograms of dry chips are acted on by 3000 kgs. of liquor containing 250 kgs. of sodium hydroxide and 200 kgs. of sodium acetate. The chips are cooked for about 6 hours at a temperature of 165° C. The cooking process being finished, the content of the digester is blown by steam into the pulp separator 2 where the black liquor is separated from the fiber; the yield is about 450 kgs. of cellulose and 4000 kgs. of black liquor. The black liquor is pumped into the high pressure tank 3 where it is heated up to about 350° C. corresponding to a pressure of about 200 atmospheres. The pressure and heat treatment effects a decomposition of the organic substances contained within the black liquor forming thereby carbonaceous material in the form of a tarry or pitchy sediment in quantity of about 200 kgs. At the same time acetic acid is formed, which latter combines with some of the sodium of the liquor so as to form sodium acetate dissolved in the liquor in a quantity of about 100 kgs.; furthermore, about 20 kgs. of methyl alcohol are formed, together with gases, which are drawn off. The methyl alcohol can be recovered from the gases by condensation.

The carbonaceous material formed by the heat and pressure treatment within the high pressure tank 3 is separated from the liquid which now is of comparatively light color and which mainly contains, besides about 300 kgs. of sodium acetate, sodium carbonate and a certain proportion of methyl alcohol. The separation of the liquor from the tarry or pitchy sediment can be effected by simple decantation.

About three-quarters of the separated liquid are introduced through conduit 9 into the causticizing tank 6 where they are causticized by interaction with lime, whereas the fourth part of the liquid is introduced through conduit 7' into the evaporator 4 and thereafter the dry residue thereof is introduced into the distilling furnace 5 where it is subjected to distillation at a temperature of about 400° C.

The evaporator 4 is preferably constructed in the form of a combined evaporator with multiple effect and open pan device.

The dry distillation yields about 27 kgs. of acetone and 6 kgs. of methyl alcohol; the residue consists of soda which is causticized within tank 6 together with the liquor introduced therein through conduit 9. The causticized liquor is returned by conduit 10 to the digester 1. The prescribed condition of the cooking liquor (250 kgs. of sodium hydrate and 200 kgs. of sodium acetate in each 3000 kgs. of total liquor, and the uniform quantity thereof, are maintained by the introduction into the cycle of a suitable quantity of sodium hydrate through conduit 7,—as before mentioned.

It may sometimes be advisable, particularly with a view to securing high yields in acetone and/or methyl alcohol, to increase the alkalinity of the black liquor prior to its introduction into the high pressure tank 3 over that which is required for recovering therefrom white liquor of normal concentration for decomposing wood within digester 1. To this end a portion of the causticized liquor from tank 6 may be introduced into the black liquor coming from pulp separator 2 on its way to the high pressure tank 3. This modification is indicated on the drawing by the provision of a conduit 14 shown in dotted lines.

Although the invention has been heretofore described with reference to a specific example, it is to be understood that it may find expression in many other embodiments, and that it is susceptible of modifications to suit particular working conditions and without deviating from the scope and spirit of the invention, as defined in the claims hereinafter appended.

I claim:—

1. The method of treating and utilizing the black liquor obtained in the soda-pulp process, which consists in submitting said liquor to a high pressure and heat treatment adapted to precipitate as solid carbonaceous and pitchy material the main portion or organic substances contained therein, then separating the liquid from the precipitate, evaporating at least a portion of said liquid to dryness, submitting the residue to dry distillation and recovering volatile products.

2. The method of treating black soda-pulp liquor, which consists in increasing the alkalinity of said liquor, submitting it to a high pressure and heat treatment adapted to precipitate as solid carbonaceous and pitchy material the main portion of organic substances contained therein, separating the liquid from the precipitate, evaporating at least a portion of said liquid to dryness, submitting the residue to dry distillation and recovering volatile products.

3. The method of treating black soda-pulp liquor, which consists in increasing the content of sodium hydroxide in such liquor, submitting it to a high pressure and heat treatment adapted to precipitate as solid carbonaceous and pitchy material the main portion of organic substances contained therein, separating the liquid from the precipitate, evaporating at least a portion of said liquid to dryness, and submitting the evaporation residue to dry distillation.

4. The method of treating soda-pulp black liquor, which consists in adding to said liquor an amount of sodium hydroxide sufficient to supply substantially the loss of alkali produced in the repeated treatment of the fibrous material with such liquor, submitting it to a high-pressure and heat treatment adapted to precipitate as solid carbonaceous and pitchy material the main portion of organic substances contained therein, separating the liquid from the precipitate, evaporating at least a portion of said liquid to dryness, submitting the residue to dry distillation and recovering volatile products.

5. The method of treating black soda pulp liquor which consists in submitting it to a high pressure and heat treatment adapted to precipitate as solid carbonaceous and pitchy material the main portion of organic substances contained therein, separating the liquid from the precipitate, using a portion of said liquid after causticization to act on pulp-yielding fibrous material, evaporating another portion to dryness, submitting the evaporated residue to dry distillation and recovering volatile products.

6. The method of treating black soda pulp liquor which consists in submitting it to a high pressure and heat treatment adapted to precipitate as solid carbonaceous and pitchy material the main portion of organic substances contained therein, separating the liquid from the precipitate, evaporating a portion of said liquid, submitting the dry residue to distillation and recovering volatile products, causticizing another portion of said liquid, thereby producing an alkaline solution which is adapted for use as a cooking liquor in pulping wood, diverting a part of said causticized liquid from the cycle and adding the other part thereof to the black liquor prior to the high pressure and heat treatment whereby to increase the alkalinity of the black liquor.

In testimony whereof, I affix my signature.

ERIK HÄGGLUND.